(12) United States Patent
Nordquist

(10) Patent No.: US 8,407,443 B1
(45) Date of Patent: *Mar. 26, 2013

(54) OFF-CHIP OUT OF ORDER MEMORY ALLOCATION FOR A UNIFIED SHADER

(75) Inventor: Bryon S. Nordquist, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 997 days.

This patent is subject to a terminal disclaimer.

(21) Appl. No.: 12/434,422

(22) Filed: May 1, 2009

Related U.S. Application Data

(63) Continuation of application No. 11/382,888, filed on May 11, 2006, now Pat. No. 7,533,236.

(51) Int. Cl.
*G06F 12/00* (2006.01)
*G06F 13/00* (2006.01)

(52) U.S. Cl. .......................... 711/170; 711/100; 711/154

(58) Field of Classification Search .................. 711/100, 711/154, 170
See application file for complete search history.

(56) References Cited

U.S. PATENT DOCUMENTS

| | | | |
|---|---|---|---|
| 5,317,720 A | 5/1994 | Stamm et al. | |
| 5,333,296 A | 7/1994 | Bouchard et al. | |
| 5,335,325 A | 8/1994 | Frank et al. | |
| 5,414,707 A * | 5/1995 | Johnston et al. | 370/395.6 |
| 5,418,973 A * | 5/1995 | Ellis et al. | 712/3 |
| 5,574,849 A | 11/1996 | Sonnier et al. | |
| 5,574,944 A | 11/1996 | Stager | |
| 6,014,690 A | 1/2000 | VanDoren et al. | |
| 6,145,061 A * | 11/2000 | Garcia et al. | 711/154 |
| 6,542,971 B1 * | 4/2003 | Reed | 711/147 |
| 6,662,280 B1 | 12/2003 | Hughes | |
| 6,880,087 B1 * | 4/2005 | Carter | 726/23 |
| 7,089,380 B1 * | 8/2006 | Schober | 711/156 |
| 7,181,573 B2 | 2/2007 | Wolrich et al. | |
| 7,577,798 B1 | 8/2009 | Moir et al. | |
| 7,650,460 B2 | 1/2010 | Cheriton | |
| 7,653,798 B2 | 1/2010 | Kim et al. | |
| 2002/0032719 A1 | 3/2002 | Thomas et al. | |

* cited by examiner

*Primary Examiner* — Tuan V. Thai
(74) *Attorney, Agent, or Firm* — Patterson & Sheridan, LLP

(57) ABSTRACT

Systems and methods for dynamically allocating memory for thread processing may reduce memory requirements while maintaining thread processing parallelism. A memory pool is allocated to store data for processing multiple threads that does not need to be large enough to dedicate a fixed size portion of the memory pool to each thread that may be processed in parallel. Fixed size portions of the memory pool are dynamically allocated and deallocated to each processing thread. Different fixed size portions may be used for different types of threads to allow greater thread parallelism compared with a system that requires allocating a single fixed portion of the memory pool to each thread. The memory pool may be shared between all of the thread types or divided to provide separate memory pools dedicated to each particular thread type.

20 Claims, 13 Drawing Sheets

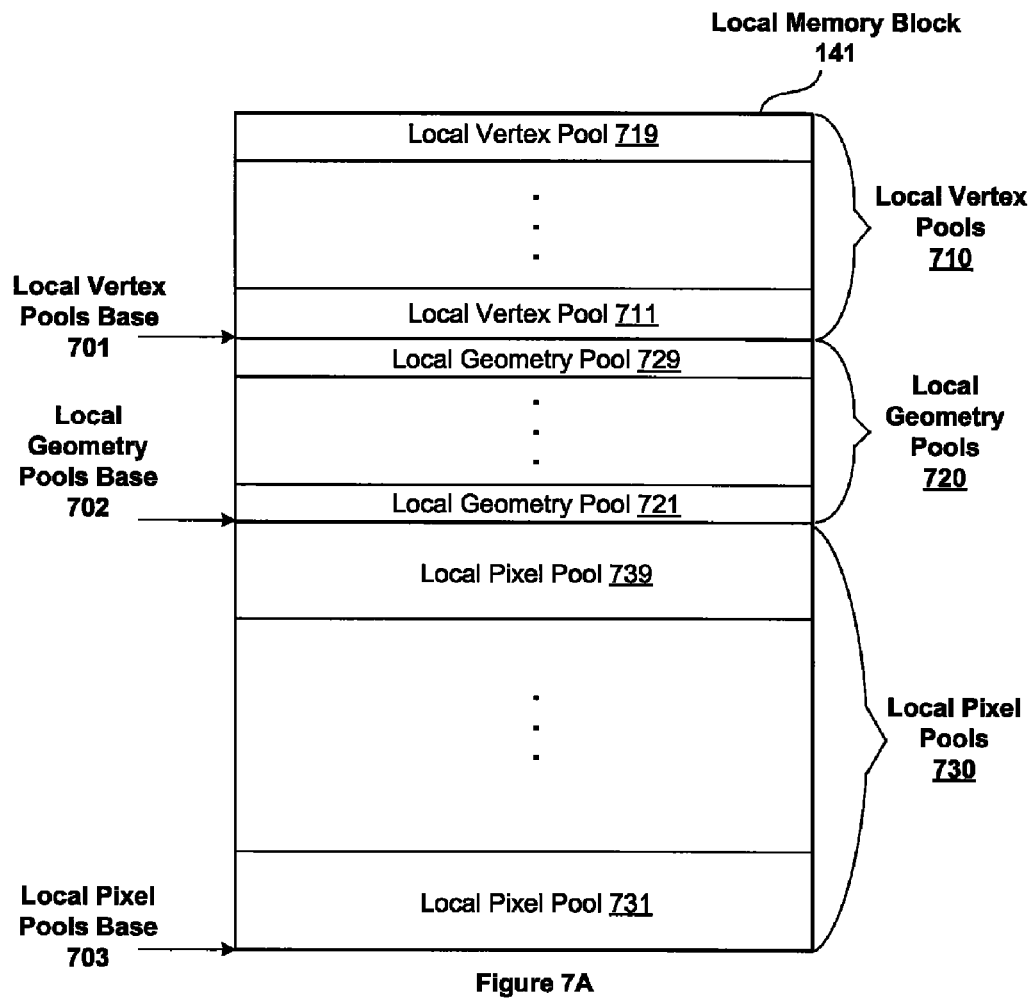
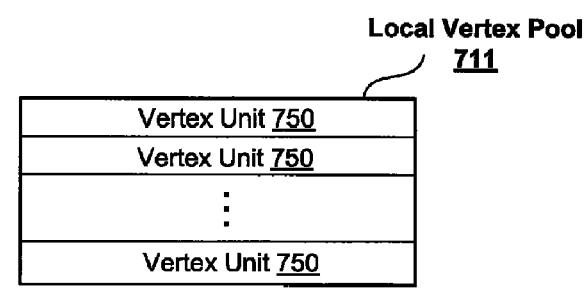
Figure 7A
Figure 7B

OFF-CHIP OUT OF ORDER MEMORY ALLOCATION FOR A UNIFIED SHADER

CROSS-REFERENCE TO RELATED APPLICATIONS

This application is a continuation of U.S. patent application Ser. No. 11/382,888, filed May 11, 2006. The subject matter of this related application is hereby incorporated by reference.

BACKGROUND OF THE INVENTION

1. Field of the Invention

Embodiments of the present invention generally relate to memory allocation for multithreaded processing and, more specifically, to dynamically allocating per-thread memory from a memory pool.

2. Description of the Related Art

Conventional multithreaded processing systems use off-chip memory to store data for each thread being processed. An amount of memory needed to store the greatest amount of data needed for a thread is needed for each of the threads that may be processed in parallel by the multithreaded processing system. Therefore, the total amount of memory needed to process the threads may be larger than is practical to dedicate to the thread processing. Increasing the off-chip memory to accommodate the memory needed for all of the threads may increase the cost of producing the processing system. In order to reduce the cost, in some conventional systems the amount of memory allocated to the threads is limited and the number of the threads that can be processed in parallel is limited by disabling some of the thread processors. In those systems, the processing performance of the multithreaded processing units may be reduced since fewer threads are processed in parallel.

Accordingly, there is a desire to allow as many threads as possible to execute in parallel even when an amount of memory equal to the greatest amount of memory needed by any of the threads is not allocated for each thread.

SUMMARY OF THE INVENTION

The current invention involves new systems and methods for dynamically allocating per-thread memory from a memory pool. A memory pool is allocated to store data for processing multiple threads. Fixed size portions of the memory pool are dynamically allocated and deallocated to each processing thread. Therefore, the memory pool is efficiently used to process as many threads in parallel as possible without requiring that the memory pool be large enough to dedicate a fixed size portion of the memory pool to each thread that may be processed in parallel. Therefore, the processing performance increases as the amount of memory allocated for the memory pool increases. Furthermore, different fixed size portions may be used for different types of threads to allow greater thread parallelism compared with a system that requires allocating a single fixed portion of the memory pool to each thread, where the single fixed size portion is equal to the largest amount of memory needed by any thread (of all of the thread types). The memory pool may be shared between all of the thread types or divided to provide a memory pool dedicated to each particular thread type.

Various embodiments of a method of the invention for processing threads in a multithreaded processor to execute a shader program include receiving a thread launch request for a first thread, determining that the first thread requires a memory allocation to execute the shader program in the multithreaded processor, obtaining an available memory offset specifying an allocation unit within a memory pool allocated for processing the threads, wherein a size of the allocation unit is based on a largest amount of memory needed by any thread to execute the shader program in the multithreaded processor, and writing the available memory offset in an entry of a thread table to allocate the allocation unit within the memory pool to the first thread.

Various embodiments of the invention include a system for multiple execution threads. The system includes a thread table, a multithreaded processing unit, and a memory allocation unit. The thread table is configured to store a memory offset for each one of the multiple execution threads. The multithreaded processing unit is configured to process the multiple execution threads using the memory allocated to the multiple execution threads. The memory allocation unit is configured to allocate allocation units from a memory pool to the multiple execution threads and deallocate the allocation units as each one of the multiple execution threads completes execution of a shader program, wherein the memory allocation unit is further configured to deallocate allocation units in either the same or a different order than the allocation units are allocated.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 7A illustrates another conceptual diagram of the local memory block of FIG. 4A in accordance with one or more aspects of the present invention.

FIG. 7B illustrates a conceptual diagram of the local vertex pool of FIG. 7A in accordance with one or more aspects of the present invention.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Systems and methods for dynamically allocating memory to store data for thread processing may reduce memory allocation requirements while maintaining thread processing parallelism. A memory pool is allocated for processing multiple threads that does not need to be large enough to dedicate a fixed size portion of the memory pool to each thread that may be processed in parallel, where the fixed size portion is the largest amount of memory needed by any thread. Fixed size portions of the memory pool are dynamically allocated and deallocated to each processing thread to allow the greatest number of threads to run in parallel based on the memory pool size. Different fixed size portions may be used for different types of threads to allow greater thread parallelism compared with a system that requires allocating a single fixed portion of the memory pool to each thread. The memory pool may be shared between all of the thread types or divided to provide separate memory pools dedicated to each particular thread type.

Figure 1:
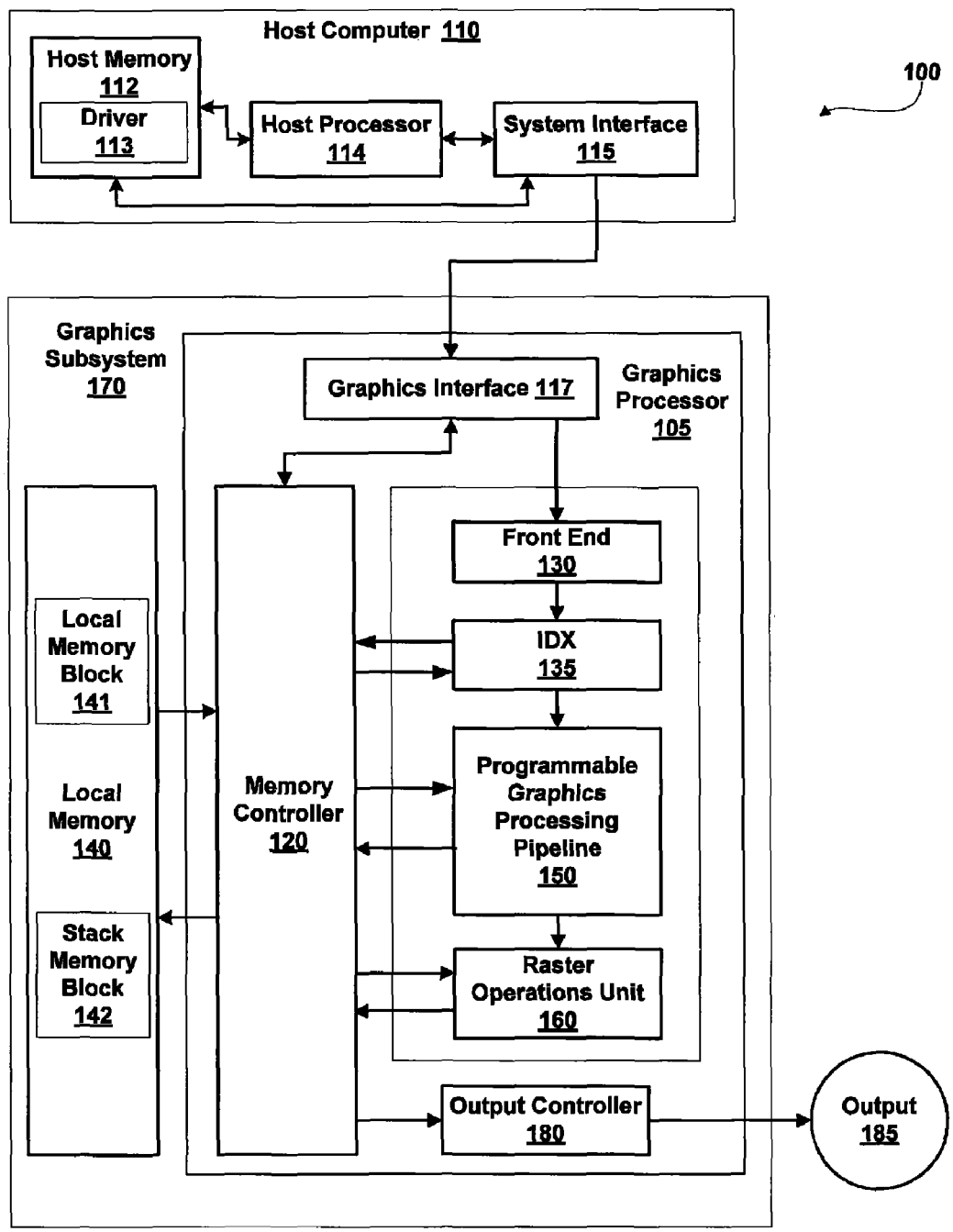
FIG. 1 illustrates a computing system including a host computer and a graphics subsystem in accordance with one or more aspects of the present invention.

FIG. 1 illustrates a computing system generally designated 100 including a host computer 110 and a graphics subsystem 170 in accordance with one or more aspects of the present invention. Computing system 100 may be a desktop computer, server, laptop computer, personal digital assistant (PDA), palm-sized computer, tablet computer, game console, cellular telephone, computer based simulator, or the like. Host computer 110 includes host processor 114 that may include a system memory controller to interface directly to host memory 112 or may communicate with host memory 112 through a system interface 115. System interface 115 may be an I/O (input/output) interface or a bridge device including the system memory controller to interface directly to host memory 112. Examples of system interface 115 known in the art include Intel® Northbridge.

A graphics device driver, driver 113, interfaces between processes executed by host processor 114, such as application programs, and a programmable graphics processor 105, translating program instructions as needed for execution by graphics processor 105. Driver 113 also uses commands to configure sub-units within graphics processor 105. Specifically, driver 113 determines the largest amount of per-thread local memory and stack memory needed by any active shader program. Driver 113 then allocates a block of local memory and stack memory, local memory block 141 and stack memory block 142, respectively, that are large enough to provide the required memory for every thread that may execute in parallel by graphics processor 105. Per-thread local memory is used to store intermediate results computed during execution of a thread. The largest amount of per-thread stack memory may be determined based on application programming interface (API) imposed limits for nesting levels that specify a maximum stack depth for use during multi-threaded processing.

When the amount of memory needed for local memory block 141 and stack memory block 142 is not available or would detrimentally impact the performance of graphics processor 105, driver 113 may reduce the allocation sizes for local memory block 141 and/or stack memory block 142 and per-thread memory allocation units within graphics processor 105 will dynamically adapt to the lower memory allocations. In conventional systems, particularly conventional systems lacking the ability to dynamically adapt to various memory allocations, a driver may reduce the number of threads that can be processed in parallel to match the memory allocations, thereby reducing overall processing throughput.

Host computer 110 communicates with graphics subsystem 170 via system interface 115 and a graphics interface 117 within a graphics processor 105. Data received at graphics interface 117 can be passed to a front end 130 or written to a local memory 140 through memory controller 120. Graphics processor 105 uses graphics memory to store graphics data and program instructions, where graphics data is any data that is input to or output from components within the graphics processor. Graphics memory can include portions of host memory 112, local memory 140, register files coupled to the components within graphics processor 105, and the like.

Graphics processor 105 includes, among other components, front end 130 that receives commands from host computer 110 via graphics interface 117. Front end 130 interprets and formats the commands and outputs the formatted commands and data to an IDX (Index Processor) 135. Some of the formatted commands are used by programmable graphics processing pipeline 150 to initiate processing of data by providing the location of program instructions or graphics data stored in memory. IDX 135, programmable graphics processing pipeline 150 and a raster operations unit 160 each include an interface to memory controller 120 through which program instructions and data can be read from memory, e.g., any combination of local memory 140 and host memory 112.

IDX 135 optionally reads processed data, e.g., data written by raster operations unit 160, from memory and outputs the data, processed data and formatted commands to programmable graphics processing pipeline 150. Programmable graphics processing pipeline 150 and raster operations unit 160 each contain one or more programmable processing units to perform a variety of specialized functions. Some of these functions are table lookup, scalar and vector addition, multiplication, division, coordinate-system mapping, calculation of vector normals, tessellation, calculation of derivatives, interpolation, and the like. Programmable graphics processing pipeline 150 and raster operations unit 160 are each optionally configured such that data processing operations are performed in multiple passes through those units or in multiple passes within programmable graphics processing pipeline 150. Programmable graphics processing pipeline 150 and raster operations unit 160 also each include a write interface to memory controller 120 through which data can be written to memory.

In a typical implementation, programmable graphics processing pipeline 150 performs geometry computations, rasterization, and pixel computations. Therefore, programmable graphics processing pipeline 150 is programmed to operate on surface, primitive, vertex, fragment, pixel, sample or any other data. For simplicity, the remainder of this description will use the term "samples" to refer to graphics data such as surfaces, primitives, vertices, pixels, fragments, or the like.

Samples output by programmable graphics processing pipeline 150 are passed to raster operations unit 160, which optionally performs near and far plane clipping and raster operations, such as stencil, z test, and the like, and saves the results or the samples output by programmable graphics processing pipeline 150 in local memory 140. When the data received by graphics subsystem 170 has been completely processed by graphics processor 105, an output 185 of graphics subsystem 170 is provided using an output controller 180. Output controller 180 is optionally configured to deliver data to a display device, network, electronic control system, other computing system 100, other graphics subsystem 170, or the like. Alternatively, data is output to a film recording device or written to a peripheral device, e.g., disk drive, tape, compact disk, or the like.

Figure 2:
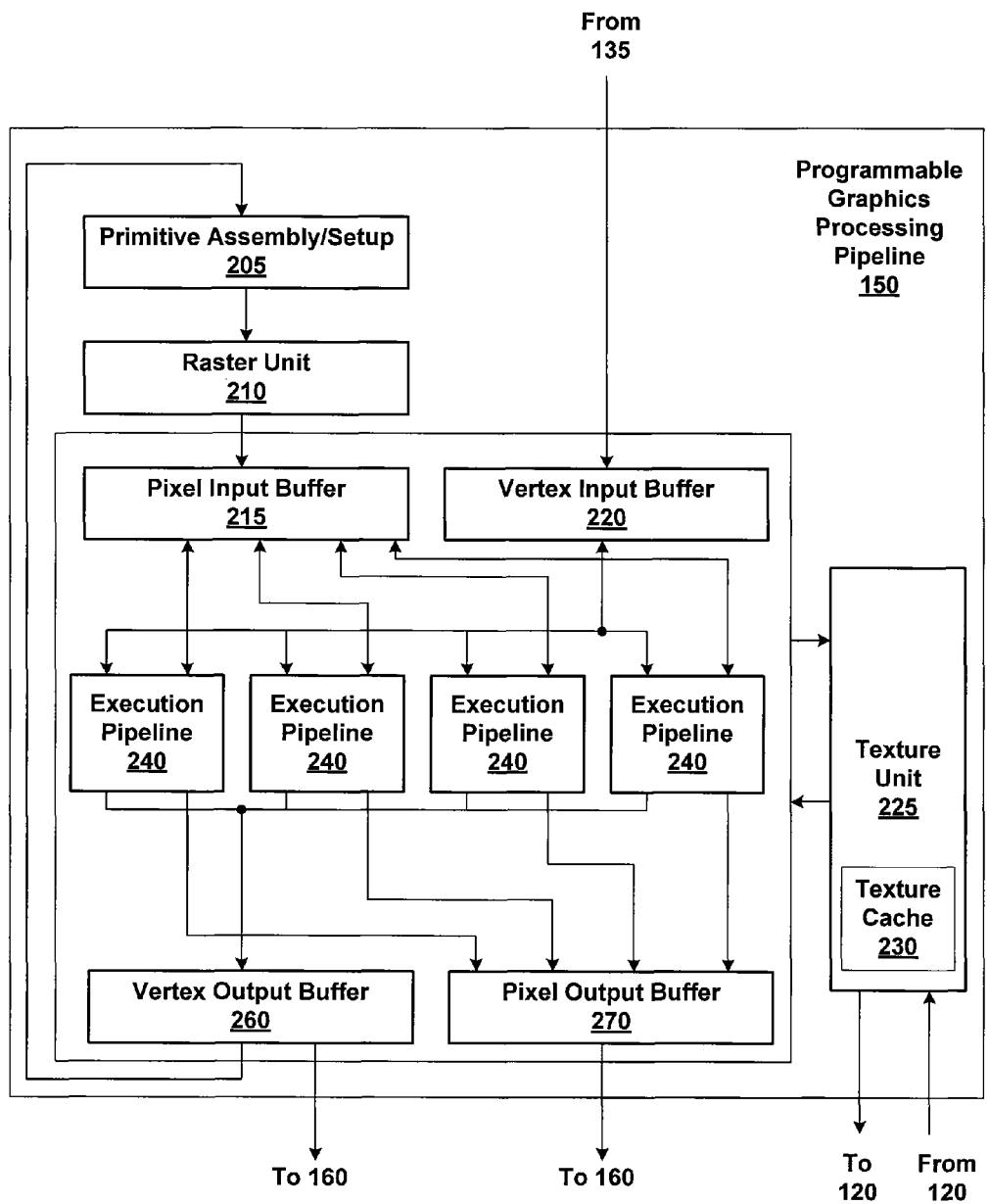
FIG. 2 illustrates the programmable graphics processing pipeline of FIG. 1 in accordance with one or more aspects of the present invention.

FIG. 2 illustrates programmable graphics processing pipeline 150 of FIG. 1 in accordance with one or more aspects of the present invention. At least one set of samples is output by IDX 135 and received by programmable graphics processing pipeline 150 and the at least one set of samples is processed according to at least one program, the at least one program including graphics program instructions. A program can process one or more sets of samples. Conversely, a set of samples can be processed by a sequence of one or more programs.

Samples, such as surfaces, primitives, or the like, are received from IDX 135 by programmable graphics processing pipeline 150 and stored in a vertex input buffer 220 including a register file, FIFO (first in first out) memory, cache, or the like (not shown). The samples are broadcast to execution pipelines 240, four of which are shown in FIG. 2. Each execution pipeline 240 includes at least one multithreaded processing unit, to be described further herein. The samples output by vertex input buffer 220 can be processed by any one of the execution pipelines 240. A sample is accepted by an execution pipeline 240 when a processing thread within the execution pipeline 240 is available to process the sample. Each execution pipeline 240 signals to vertex input buffer 220 when a sample can be accepted or when a sample cannot be accepted. In one embodiment of the present invention, programmable graphics processing pipeline 150 includes a single execution Pipeline 240 containing one multithreaded processing unit. In other embodiments of the present invention, programmable graphics processing pipeline 150 includes a plurality of execution pipelines 240.

Driver 113 may disable an execution pipeline 240 when the execution pipeline 240 was identified to have one or more non-functioning sub-units. Disabling a non-functioning execution pipeline 240 allows graphics processor 105 to be used to process graphics data, possibly with lower performance than a fully functional graphics processor 105. In some embodiments of the present invention, driver 113 may also disable an execution pipeline 240 or limit the number of threads an execution pipeline 240 processes in parallel in order to reduce the amount of memory needed for local memory block 141 and/or stack memory block 142. Each enabled execution pipeline 240 is assigned a corresponding identifier and local memory block 141 and stack memory block 142 do not include memory for disabled execution pipelines 240 to provide improved memory utilization.

Execution pipelines 240 may receive first samples, such as higher-order surface data, and tessellate the first samples to generate second samples, such as vertices. Execution pipelines 240 may be configured to transform the second samples from an object-based coordinate representation (object space) to an alternatively based coordinate system such as world space or normalized device coordinates (NDC) space. Each execution pipeline 240 may communicate with texture unit 225 using a read interface (not shown in FIG. 2) to read program instructions, stack data, and graphics data such as texture maps from local memory 140 or host memory 112 via memory controller 120 and a texture cache 230. Texture cache 230 is used to improve memory read performance by reducing read latency. In one embodiment of the present invention, texture cache 230 is omitted. In another embodiment of the present invention, a texture unit 225 is included in each execution pipeline 240. Alternatively, each execution pipeline 240 has a dedicated instruction read interface to read program instructions from local memory 140 or host memory 112 via memory controller 120.

Execution pipelines 240 output processed samples, such as vertices, that are stored in a vertex output buffer 260 including a register file, FIFO memory, cache, or the like (not shown). Processed vertices output by vertex output buffer 260 are received by a primitive assembly/setup unit 205. Primitive assembly/setup unit 205 calculates parameters, such as deltas and slopes, to rasterize the processed vertices and outputs parameters and samples, such as vertices, to a raster unit 210. Raster unit 210 performs scan conversion on samples, such as vertices, and outputs samples, such as fragments, to a pixel input buffer 215. Alternatively, raster unit 210 resamples processed vertices and outputs additional vertices to pixel input buffer 215.

Pixel input buffer 215 outputs the samples to each execution pipeline 240. Samples, such as pixels and fragments, output by pixel input buffer 215 are each processed by only one of the execution pipelines 240. Pixel input buffer 215 determines which one of the execution pipelines 240 to output each sample to depending on an output pixel position, e.g., (x,y), associated with each sample. In this manner, each sample is output to the execution pipeline 240 designated to process samples associated with the output pixel position. In an alternate embodiment of the present invention, each sample output by pixel input buffer 215 is processed by one of any available execution pipelines 240.

Each execution pipeline 240 signals to pixel input buffer 215 when a sample can be accepted or when a sample cannot be accepted. Program instructions configure programmable computation units (PCUs) within an execution pipeline 240 to perform operations such as tessellation, perspective correction, texture mapping, shading, blending, and the like. Processed samples are output from each execution pipeline 240 to a pixel output buffer 270. Pixel output buffer 270 optionally stores the processed samples in a register file, FIFO memory, cache, or the like (not shown). The processed samples are output from pixel output buffer 270 to raster operations unit 160.

Figure 3:
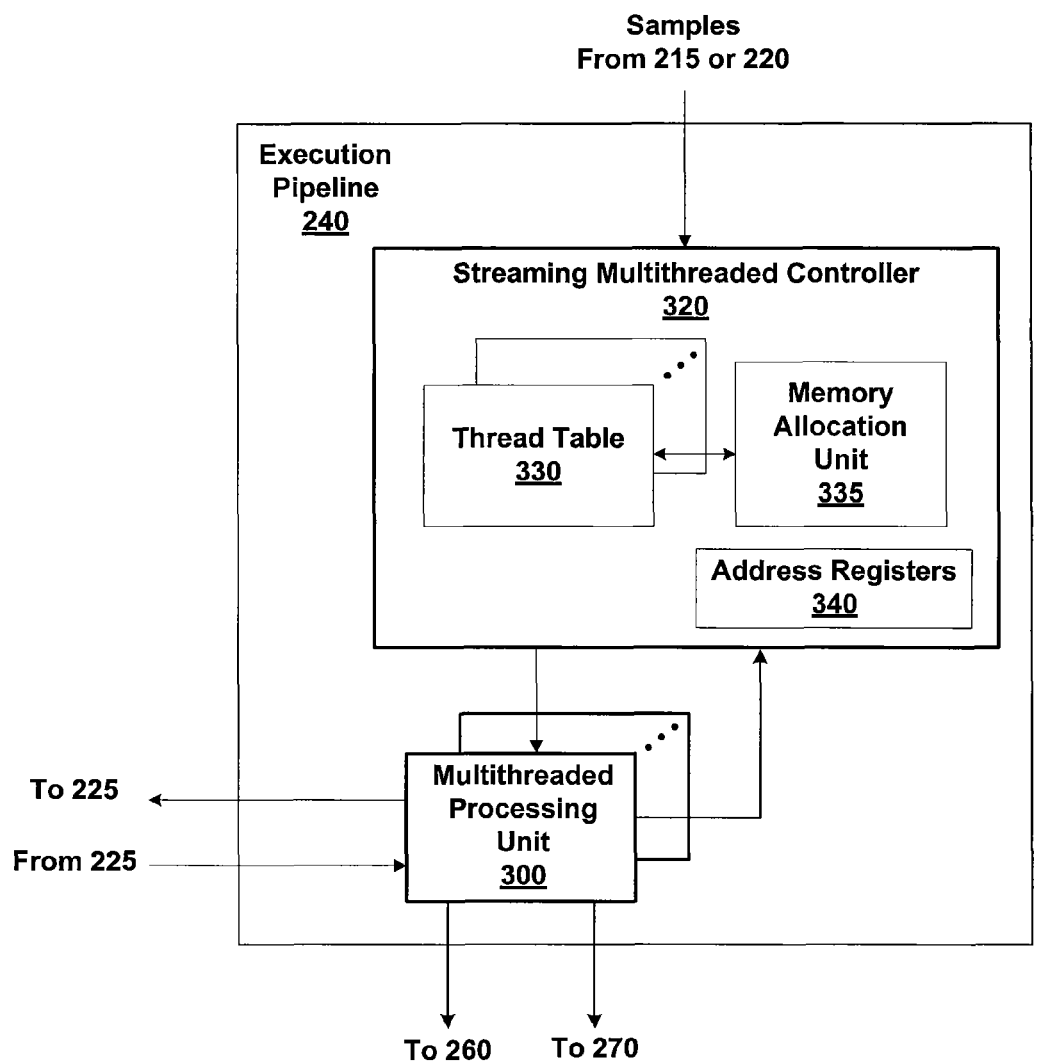
FIG. 3 illustrates the execution pipeline of FIG. 2 in accordance with one or more aspects of the present invention.

FIG. 3 illustrates execution pipeline 240 of FIG. 2, including at least one multithreaded processing unit 300, in accordance with one or more aspects of the present invention. An execution pipeline 240 can contain a plurality of multithreaded processing units 300, with each multithreaded processing unit 300 that is configured using program instructions read by a Streaming multithreaded controller 320 via texture unit 225. Multithreaded processing units 300 perform computations specified by the program instructions and output data to at least one destination, e.g., pixel output buffer 160, vertex output buffer 260, and local memory block 141.

One characteristic of the system disclosed in FIGS. 1, 2, and 3 is that it may be configured to embody a SIMD (single instruction multiple data) architecture, where a thread is assigned to each sample processed in the one or more execution pipelines 240. Therefore, a single program may be used to process several sets of samples. Streaming multithreaded controller 320 receives samples or pointers to samples stored in pixel input buffer 215 and vertex input buffer 220. Streaming multithreaded controller 320 receives a pointer to a program to process one or more of the samples.

In one embodiment of the present invention, streaming multithreaded controller 320 assigns a thread (threadID) to each sample to be processed. A thread includes a pointer to a program instruction (program counter), such as the first instruction within the program, thread state information, and storage resources for storing intermediate data generated when processing the sample, i.e., a portion of local memory block 141. In other embodiments of the present invention, rather than assigning a different threadID to each thread, streaming multithreaded controller 320 assigns a threadID to several threads that are processed as a group. However, there are points in a program (i.e., branches) where threads in a thread group are allowed to "diverge" from one another so that one or more threads may execute instructions on their respective samples that do not need to be executed by the other threads in the thread group. Stack memory 142 may be used to store processing state information for a portion of threads in a group when one or more threads in the thread group diverge. Divergent threads in a thread group may be synchronized at various points in the program to guarantee that some level of synchronized processing may be achieved at those points. Once all of the threads in the thread group are synchronized, the threads resume execution in lock-step, i.e. each sample is processed by the same sequence of instructions in a SIMD manner.

Streaming multithreaded controller 320 includes a memory allocation unit 335, address registers 340, and thread tables 330. Each thread table 330 may correspond to a single multithreaded processing unit 300. A thread table 330 includes an entry for each thread that may be processed in parallel by a multithreaded processing unit 300. Memory allocation unit 335 allocates a portion of memory, local memory block 141 and/or stack memory block 142, to initiate execution of a thread, as described in conjunction with FIGS. 5B and 6B. Memory allocation unit 335 also deallocates the portion(s) of memory when execution of the thread is complete, as described in conjunction with FIGS. 5C and 6C. Multithreaded processing units 300 notify memory allocation unit 335 when execution of a thread is complete.

Figure 4A:
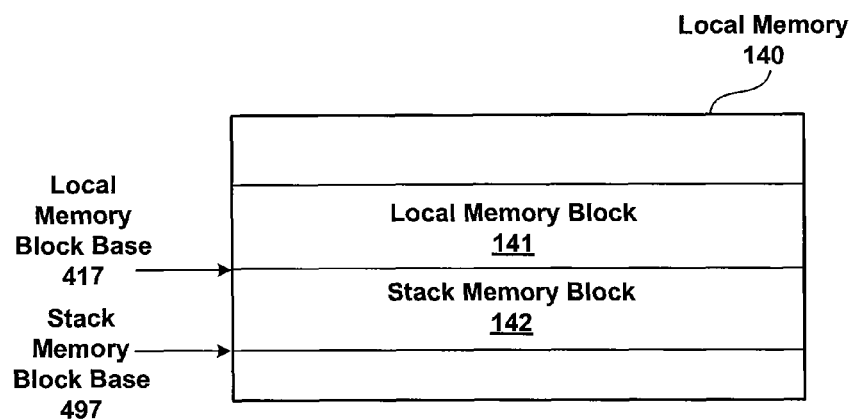
FIG. 4A illustrates a conceptual diagram of a local memory block and a stack memory block in accordance with one or more aspects of the present invention.

Address registers 340 store base addresses of local memory block 141 and stack memory block 142, as described in conjunction with FIG. 4A. Offsets relative to the base addresses are stored in an entry of thread table 330 by memory allocation unit 335 when the portions of memory are allocated to a thread. The base addresses and offsets are combined and provided to a multithreaded processing unit 300 by streaming multithreaded controller 320 to process the thread. This provides each thread with a unique memory allocation within local memory block 141 and/or stack memory block 142. In embodiments of the present invention that include two or more execution pipelines 240, each execution pipeline 240 has a unique identifier that is combined with the base address and offset to produce an address within a portion of local memory block 141 or stack memory block 142 allocated to the particular execution pipeline 240, as described in conjunction with FIG. 4B.

FIG. 4A illustrates a conceptual diagram of local memory block 141 and stack memory block 142, in accordance with one or more aspects of the present invention. Local memory block 141 is a single block of memory within local memory 140 that is allocated for use by all of the execution pipelines 240. Similarly, stack memory block 142 is a single block of memory within local memory 140 that is allocated for use by all of the execution pipelines 240. Within local memory 140, a local memory block base 417 and a stack memory block base 297 are base addresses corresponding to local memory block 141 and stack memory block 142, respectively.

Figure 4B:
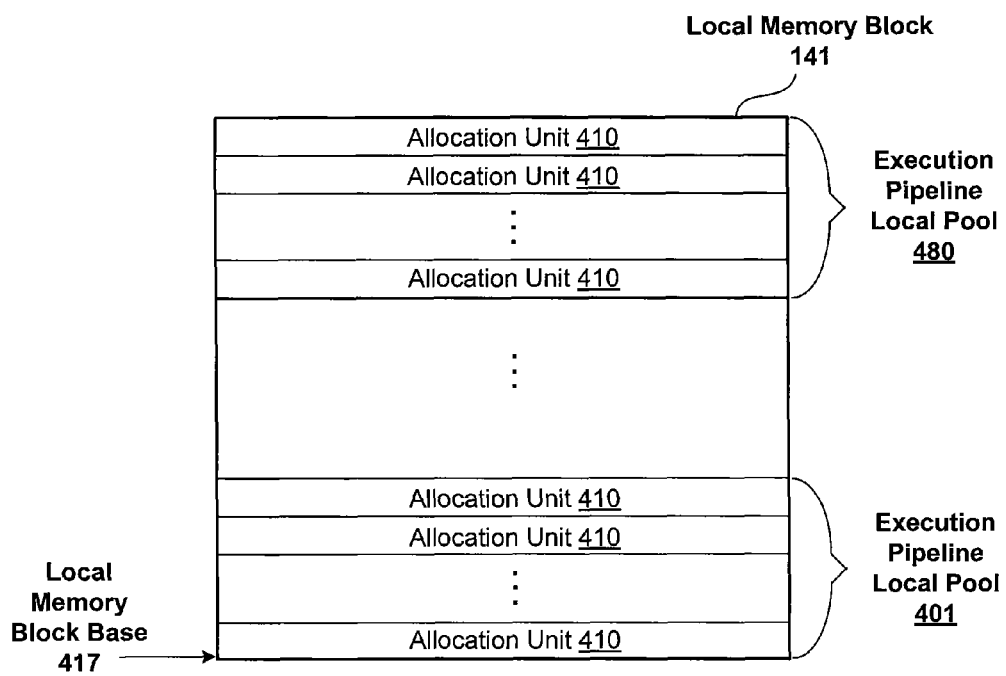
FIG. 4B illustrates a conceptual diagram of the local memory block of FIG. 4A in accordance with one or more aspects of the present invention.

FIG. 4B illustrates a conceptual diagram of local memory block 141 of FIG. 4A, in accordance with one or more aspects of the present invention. Although local memory block 141 is shown in FIG. 4B, the memory allocation concepts described in conjunction with FIG. 4B may be used for stack memory block 142 or other types of memory allocated for processing threads.

Local memory block 141 includes a pool of memory for each enabled execution pipeline 240. For example, a first portion of local memory block 141, execution pipeline local pool 480 is allocated to a first execution pipeline 240 and another portion of local memory block 141 is allocated to another execution pipeline 240. An allocation unit 410 is the amount of memory allocated to each thread and the amount of memory included in allocation unit 410 is the largest amount of local memory needed by any active shader program. Within stack memory block 142, the amount of memory included in an allocation unit is the largest amount of stack memory needed by any active shader program.

The unique identifier for a particular execution pipeline 240 may be used to locate the pool of memory within local memory block 141 allocated for that particular execution pipeline 240. Specifically, the pool of memory allocated to an execution pipeline 240, execution pipeline local pool 401 or 480, may be addressed by combining local base 497 with the unique identifier for the execution pipeline 240. Entries within the particular local pool allocated to a thread may be addressed using the memory offset corresponding to the thread (read from a thread table 330) and the load/store address specified by the program instruction.

Each execution pipeline local pool includes an allocation unit 410 for each thread that may be processed in parallel. In some embodiments of the present invention, each execution pipeline local pool includes 24 allocation units 410. In one embodiment of the present invention, an execution pipeline 240 may be configured to process fewer threads in parallel due to non-functional sub-units or when graphics processor 105 is configured in a low-power or low performance mode. Similarly, one or more execution pipelines 240 may be completely disabled in which case an execution pipeline local pool is not allocated to those one or more execution pipelines 240. Therefore, local memory block 141 is allocated between fewer execution pipelines 240, providing each enabled execution pipeline 240 with more local memory to process more threads in parallel.

Figure 5A:
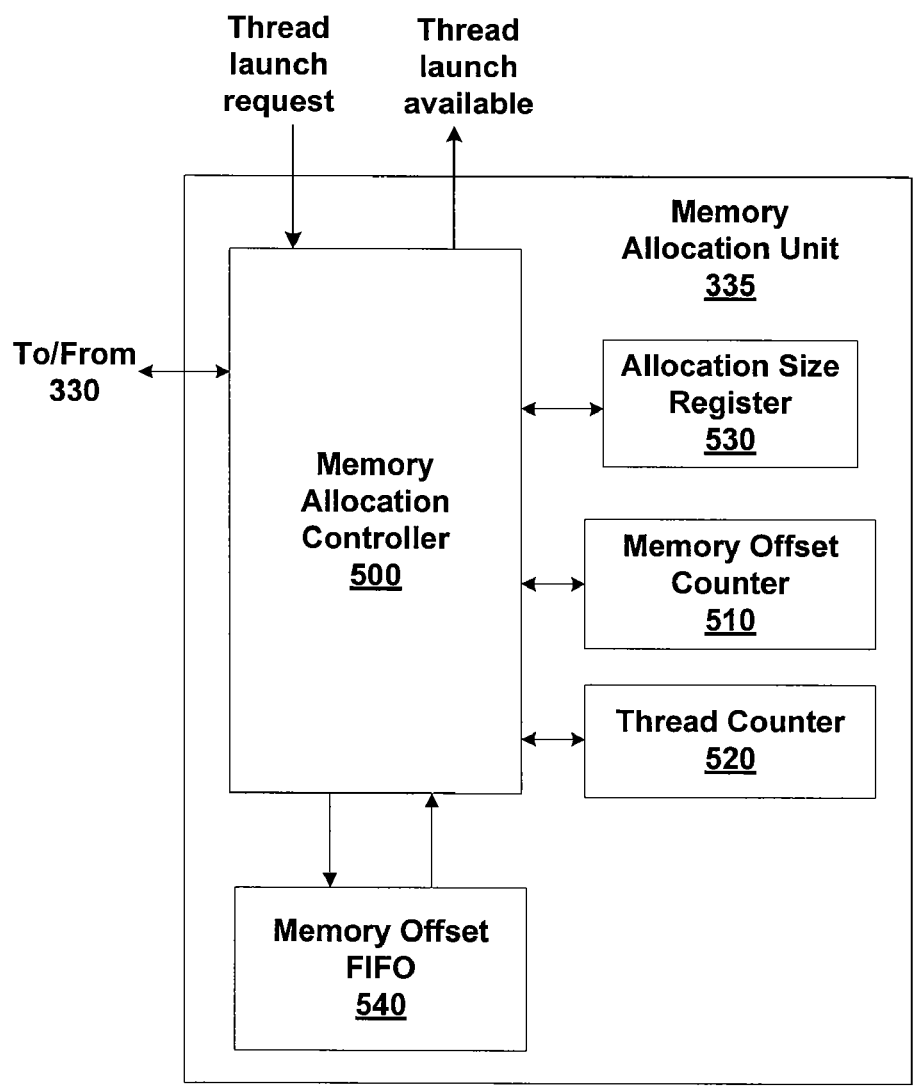
FIG. 5A illustrates a block diagram of the memory allocation unit of FIG. 3 in accordance with one or more aspects of the present invention.
Figure 5B:
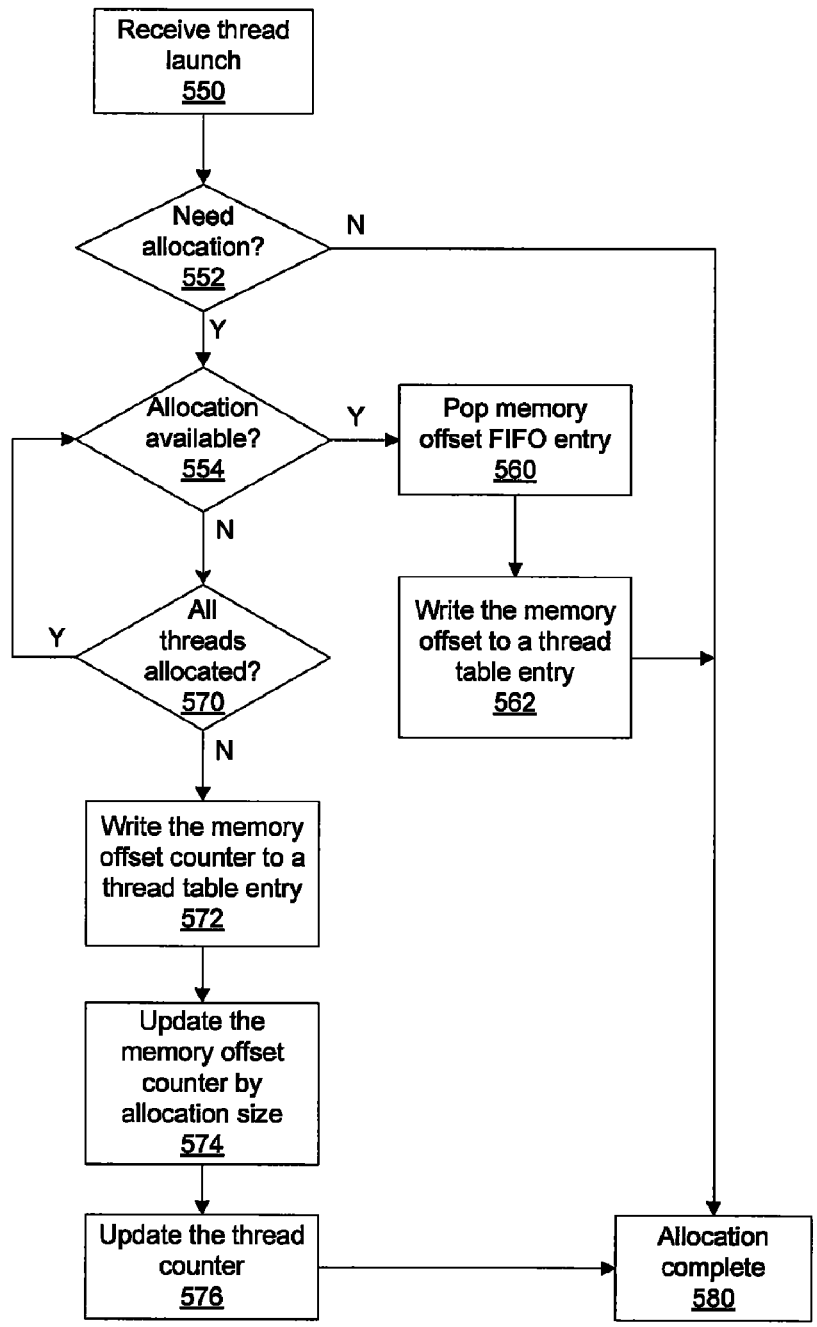
FIG. 5B illustrates a flow diagram of an exemplary method of allocating memory for a thread in accordance with one or more aspects of the present invention.
Figure 5C:
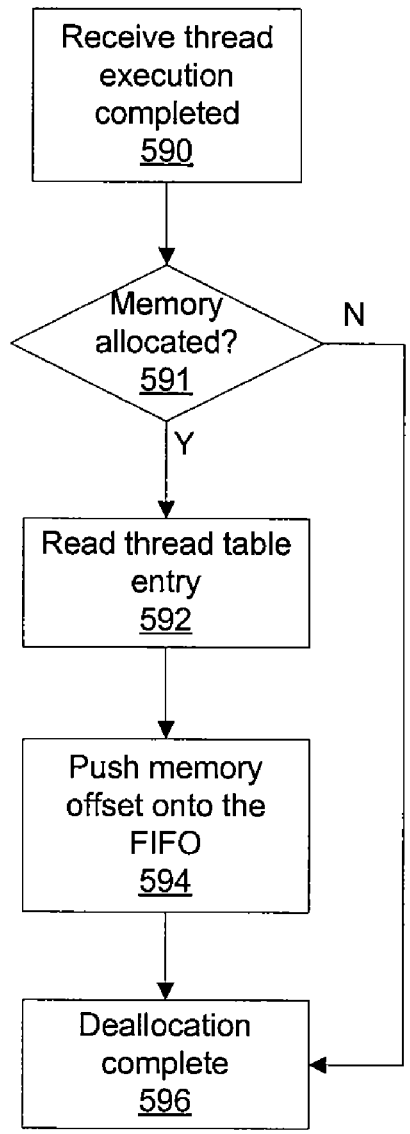
FIG. 5C illustrates a flow diagram of an exemplary method of deallocating memory for a thread in accordance with one or more aspects of the present invention.

Using a single size allocation unit 410 for all shader types is advantageous because all threads can process any shader type and allocation units 410 may be allocated and deallocated out of order, as described in conjunction with FIGS. 5B and 5C. Using a single pool of memory, such as execution pipeline local pools 401 and 408 is advantageous since threads processing a particular shader type may use a large share or a small share of the pool, dynamically adapting to the processing needs of a particular shader program.

FIG. 5A illustrates a block diagram of memory allocation unit 335 of FIG. 3, in accordance with one or more aspects of the present invention. Memory allocation unit 335 receives thread launch requests constructed by streaming multi-threaded controller 320 based on samples received from pixel input buffer 214 and vertex input buffer 220 for processing by a shader program. Memory allocation unit 335 includes a memory allocation controller 500 that accesses an allocation size register 530, a memory offset counter 510, a thread counter 520, and a memory offset FIFO memory 540 to read and write entries in thread tables 330. Allocation size register 530 stores the size of allocation unit 410 and is programmed by driver 113. Before the size of allocation unit 410 may be changed, all allocation units 410 should be deallocated, i.e., all of the threads should complete processing.

Memory offset counter 510 is initialized to zero and is incremented by the value in allocation size register 530 whenever an allocation unit 410 is allocated to a thread. Memory offset counter 510 wraps through zero when it overflows rather than saturating. Thread counter 520 is also initialized to zero and increments whenever an allocation unit 410 is allocated to a thread. Thread counter 510 represents the number of entries in thread tables 330. Memory offset counter 510 and thread counter 520 are both reset to zero when the size of allocation unit 410 is changed, i.e., when allocation size register 530 is written. In some embodiments of the present invention, memory offset counter 510 is 24 bits and increments in an allocation size of 16 bytes for local memory block 141. In some embodiments of the present invention, memory offset counter 510 is 15 bits and increments in an allocation size of 128 bytes for stack memory block 142.

Memory offset FIFO 540 is a deallocation buffer that stores memory offsets for allocation units 410 that have been deallocated and are available for allocation to launch another thread. The number of entries in memory offset FIFO 540 is equal to the number of entries in thread tables 330. The width of offset FIFO 540 matches the width of memory offset counter 510. Memory offset FIFO 540 is reset to empty when the size of allocation unit 410 is changed.

FIG. 5B illustrates a flow diagram of an exemplary method of allocating memory for a thread, in accordance with one or more aspects of the present invention. The method shown in FIG. 5B may be used to allocate portions of local memory block 141 or stack memory block 142 to process shader program threads. In step 550 memory allocation controller 500 receives a thread launch request. In step 552 memory allocation controller 500 determines if the thread requires a memory allocation, e.g., local memory or stack memory, and, if not, memory allocation controller 500 proceeds directly to step 580 and the memory allocation is complete since there is no need to allocate memory to the thread.

If, in step 552 memory allocation controller 500 determines that the thread requires a memory allocation, then in step 554 memory allocation controller 500 determines if an allocation unit 410 is available. An allocation unit 410 is available when memory offset FIFO 540 is not empty, i.e., when a memory offset is stored in memory offset FIFO 540. If, in step 554 memory allocation controller 500 determines that an allocation unit 410 is available, then in step 560 memory allocation controller 500 pops a (deallocated) memory offset stored in an entry of memory offset FIFO 540. In step 562 memory allocation controller 500 writes the popped memory offset into an available entry in a thread table 330 and proceeds directly to step 580 since the memory allocation is complete.

If, in step 554 memory allocation controller 500 determines that an allocation is not available, then in step 570 memory allocation controller 500 determines if all of the threads are allocated. Memory allocation controller 500 may determine whether or not all of the threads are allocated by reading thread counter 520 and comparing the value of thread counter to a limit specifying the maximum number of threads that may be processed in parallel. The limit may be programmed by driver 113 in order to reduce the amount of memory needed for local memory block 141 or stack memory block 142. When all of the threads are allocated, all of the entries in thread tables 330 are occupied with active threads and memory allocation controller 500 returns to step 554 to wait until a thread completes execution and deallocates its allocation unit 410. When memory allocation controller 500 cannot allocate memory for a thread launch request it indicates that a launch is not available, effectively stalling further thread launch requests.

If in step 570 memory allocation controller 500 determines if all of the threads are not allocated, then in step 572 an allocation unit 410 is available. A memory offset corresponding to the allocation unit 410 has not been pushed into memory offset FIFO 540 since this is the first allocation of the allocation unit 410 following a change to allocation size register 530 or a reset. In step 572 memory allocation controller 500 reads memory offset counter 510 and writes the value to an available entry in a thread table 330. In step 574 memory allocation controller 500 updates memory offset counter 510 by adding the value of allocation size register 530 to the value in memory offset counter 510. The value of memory offset counter 510 then corresponds to the next available allocation unit 410. Once the memory offset counter 510 overflows, the memory offset values will be obtained from memory offset FIFO 540, until allocation size register 530 is changed or memory allocation unit 335 is reset.

In step 576 memory allocation controller 500 updates thread counter 520, incrementing the value in thread counter 520 to indicate that an allocation unit 410 has been allocated to another thread. Memory allocation controller 500 then proceeds to step 580 and the memory allocation for the thread launch request is complete.

FIG. 5C illustrates a flow diagram of an exemplary method of deallocating memory for a thread, in accordance with one or more aspects of the present invention. The method shown in FIG. 5C may be used to deallocate portions of local memory block 141 or stack memory block 142 to process shader program threads. In step 590 memory allocation unit 335 receives a thread execution completed signal from a multithreaded processing unit 300. The signal includes the thread ID of the completed thread. In step 591 memory allocation controller 500 determines if an allocation unit 410 was allocated to the thread, and, if not, memory allocation controller 500 proceeds directly to step 596 and the deallocation is complete.

If, in step 591 memory allocation controller 500 determines that an allocation unit 410 was allocated to the thread, then in step 592 memory allocation controller 500 reads an entry of a thread table 330 corresponding to the thread ID to obtain the memory offset stored for the thread. In step 594 memory allocation controller 500 pushes the memory offset onto memory offset FIFO 540 to deallocate the allocation unit 410 making the allocation unit 410 available for allocation to another thread. In step 596 the deallocation is complete.

An advantage of the memory allocation and deallocation methods described in conjunction with FIGS. 5A, B, and C is that allocation units 410 may be allocated and deallocated in any order. Therefore, a first thread that requires a longer time to execute will not prevent other threads from receiving a memory allocation, even when the first thread received a memory allocation before the other threads. Furthermore, an allocation unit 410 may be allocated to any thread type since it is sized to support the largest memory requirement. All allocation units 410 within a single pool may be allocated to a single thread type or to a variety of thread types, as needed to process the samples received from pixel input buffer 215 and vertex input buffer 220.

Figure 6A:
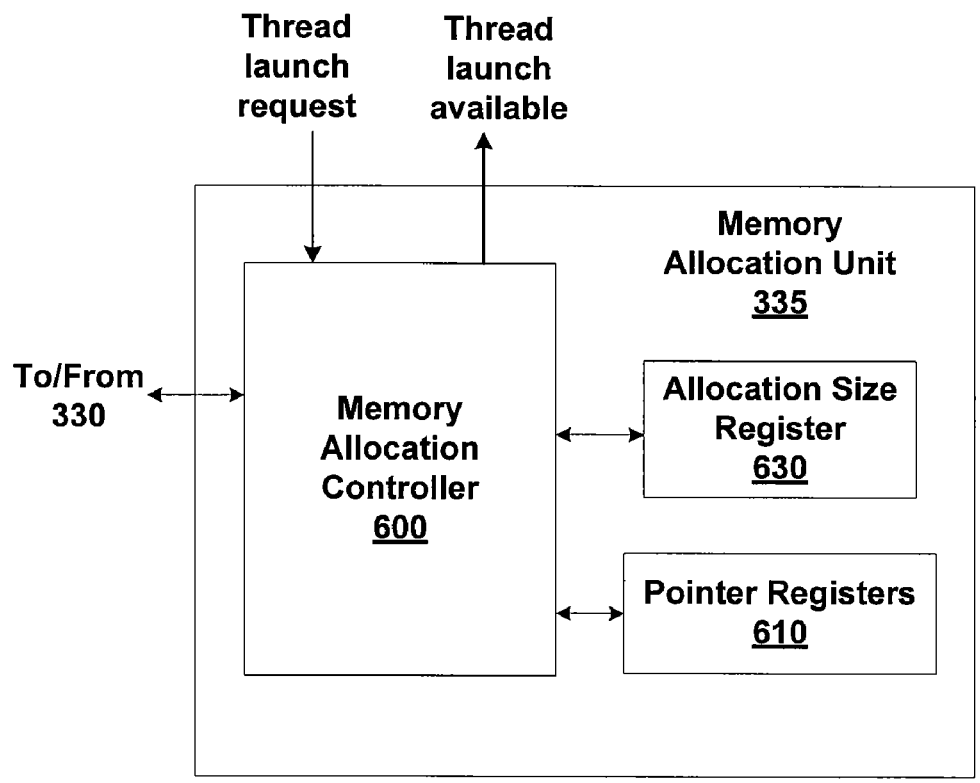
FIG. 6A illustrates another block diagram of the memory allocation unit of FIG. 3 in accordance with one or more aspects of the present invention.

FIG. 6A illustrates another block diagram of memory allocation unit 335 of FIG. 3, in accordance with one or more aspects of the present invention. In this embodiment of the present invention, memory allocation unit 335 includes a memory allocation controller 600 that accesses an allocation size register 630 and pointer registers 610 to read and write entries in thread tables 330. Like allocation size register 530, allocation size register 630 stores the size of allocation unit 410 and is programmed by driver 113.

Pointer registers 610 store a head pointer and a tail pointer for a local memory pool that are used to configure the local memory pool as a ring buffer. Unlike the embodiment of memory allocation unit 335 described in conjunction with FIGS. 5A, B, and C, the "out of order" memory allocation unit 335, allocation units 410 may not be allocated and deallocated out of order. However, the die area needed to implement this embodiment is less than the "out of order" memory allocation unit 225. The head pointer and tail pointer are both reset to zero when memory allocation unit 335 is reset or when the size of allocation unit 410 is changed, i.e., when allocation size register 630 is written. Memory allocation unit controller 600 also indicates that the ring buffer is empty, i.e., not full, to distinguish for the case when the head and tail pointers are equal and the ring buffer is full.

The tail pointer indicates the oldest in-use memory pool allocation, i.e., the memory offset of the oldest allocated allocation unit 410. The head pointer indicates the next free memory pool allocation, i.e., the memory offset of the first available allocation unit 410. In some embodiments of the present invention, the read pointer and the tail pointer are each 23 bits and represent an allocation unit 410 size of 16 bytes for local memory block 141. In some embodiments of the present invention, the read pointer and the tail pointer are each 14 bits and represent an allocation unit 410 size of 128 bytes for stack memory block 142. The width of entries in thread tables 330 matches the width of the associated memory pool head and tail pointers.

Figure 6B:
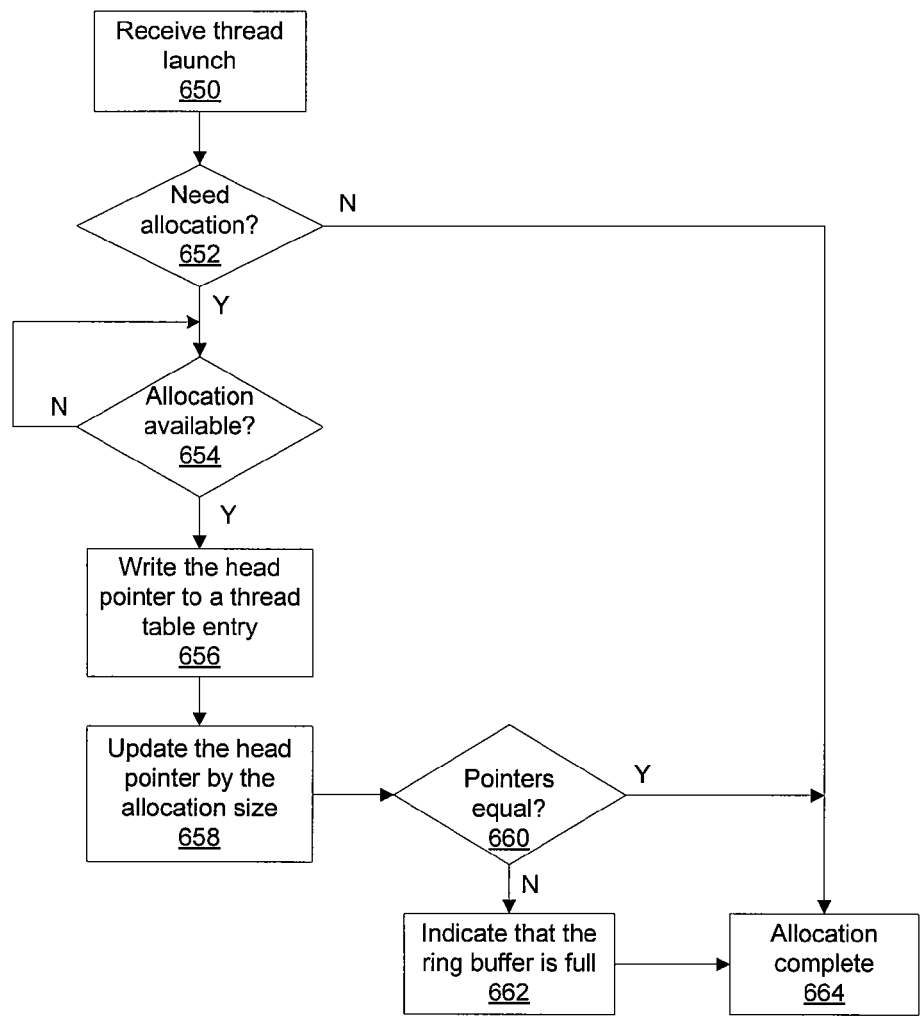
FIG. 6B illustrates a flow diagram of another exemplary method of allocating memory for a thread in accordance with one or more aspects of the present invention.

FIG. 6B illustrates a flow diagram of another exemplary method of allocating memory for a thread in accordance with one or more aspects of the present invention. The method shown in FIG. 6B may be used to allocate portions of local memory block 141 or stack memory block 142 to process shader program threads. In step 650 memory allocation controller 600 receives a thread launch request. In step 652 memory allocation controller 600 determines if the thread requires a memory allocation, e.g., local memory or stack memory, and, if not, memory allocation controller 600 proceeds directly to step 664 and the memory allocation is complete since there is no need to allocate memory to the thread.

If, in step 652 memory allocation controller 600 determines that the thread requires a memory allocation, then in step 654 memory allocation controller 600 determines if an allocation is available. An allocation is available when the tail pointer and head pointer stored in pointer registers 610 are not equal and the ring buffer is not full. If, in step 654 memory allocation controller 600 determines that an allocation unit 410 is available, then in step 656 memory allocation controller 600 writes the head pointer into an available entry in a thread table 330. In step 658 memory allocation controller 600 updates the head pointer, increasing it by the value of allocation size register 630. When the head pointer is increased and overflows, the head pointer value wraps rather than saturates. The value of the head pointer stored in pointer registers 610 then corresponds to the next available allocation unit 410.

In step 660 memory allocation controller 600 determines if the tail pointer equals the head pointer, and, if so, in step 662 memory allocation controller 600 indicates that the ring buffer is full. Memory allocation controller 600 then proceeds to step 664 and the memory allocation for the thread launch request is complete. If, in step 660 memory allocation controller 600 determines that the tail pointer does not equal the head pointer, then memory allocation controller 600 proceeds directly to step 664.

If, in step 654 memory allocation controller 600 determines that an allocation is not available, then memory allocation controller 600 returns to step 654 to wait until a thread completes execution and deallocates its allocation unit 410. When all of the threads are allocated, all of the entries in thread tables 330 are occupied with active threads.

Figure 6C:
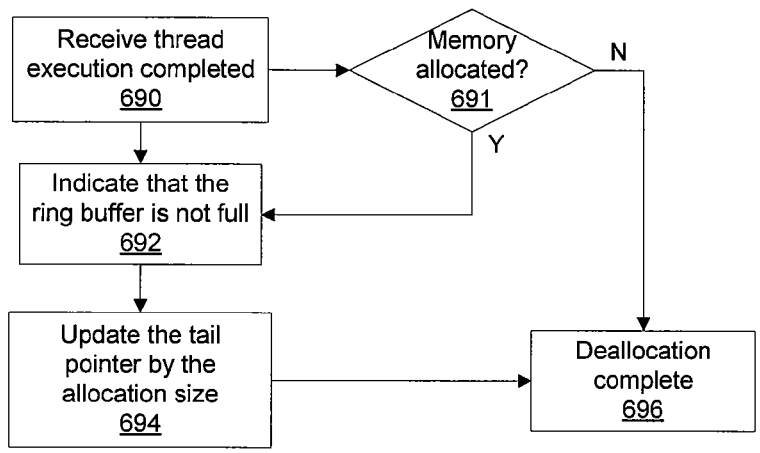
FIG. 6C illustrates a flow diagram of another exemplary method of deallocating memory for a thread in accordance with one or more aspects of the present invention.

FIG. 6C illustrates a flow diagram of another exemplary method of deallocating memory for a thread in accordance with one or more aspects of the present invention. The method shown in FIG. 6C may be used to deallocate portions of local memory block 141 or stack memory block 142 to process shader program threads. In step 690 memory allocation unit 335 receives a thread execution completed signal from a multithreaded processing unit 300. The signal includes the thread ID of the completed thread. In step 691 memory allocation controller 600 determines if an allocation unit 410 was allocated to the thread, and, if not, memory allocation controller 600 proceeds directly to step 696 and the deallocation is complete.

If, in step 691 memory allocation controller 600 determines that an allocation unit 410 was allocated to the thread, then in step 692 memory allocation controller 600 indicates that the ring buffer is not full. The entry corresponding to the thread ID becomes available to store another memory offset, e.g., head pointer value, thereby making an allocation unit 410 available for allocation to another thread. In step 694 memory allocation controller 600 updates the tail pointer by increasing it by the value of allocation size register 630. When the tail pointer is increased and overflows, the tail pointer value wraps rather than saturates. The value of the tail pointer stored in pointer registers 610 then corresponds to the oldest in-use memory pool allocation. In step 596 the deallocation is complete.

An advantage of the methods for allocating and deallocating memory for threads as described in conjunction with FIGS. 6B and C is that allocation size changes, changes to the value stored in allocation size register 630 may be pipelined. Therefore, all of the allocation units 410 do not need to be deallocated before allocation size register 630 is written with a different value. However, the previous value stored in allocation size register 630 does need to be retained until the tail pointer is updated to equal the value of the head pointer at the time allocation size register was written. Furthermore, an allocation unit 410 may be allocated to any thread type since it is sized to support the largest memory requirement. All allocation units 410 within a single pool may be allocated to a single shader thread type or to a variety of shader thread types, as needed to process the samples received from pixel input buffer 215 and vertex input buffer 220.

Sharing a memory pool between different shader thread types may be undesirable when the memory requirement of the different shader thread types is not similar. For example, when one of the shader thread types require a large memory allocation, a portion of each allocation unit 410 will be unused for the other shader thread types. As allocation unit 410 increases to accommodate the largest shader thread type allocalton, fewer allocation units 410 will fit within the memory pool, reducing the number of threads that may be processed in parallel. Therefore, thread processing throughput may decrease when a single size allocation unit 410 is used for all shader thread types. An alternative embodiment of the present invention, includes different memory pools for each shader type and an allocation unit size may be specified for each shader type.

FIG. 7A illustrates another conceptual diagram of local memory block 141 of FIG. 4A including dedicated memory pools for each shader type, in accordance with one or more aspects of the present invention. Although local memory block 141 is shown in FIG. 7A, the memory allocation concepts described in conjunction with FIGS. 7A, B, C, and D may be used for stack memory block 142 or other types of memory allocated for processing threads.

In the shared memory scheme described in conjunction with FIG. 4B a single memory pool is allocated to an enabled execution pipeline 240 and the memory pool sized is the same for each enabled execution pipeline 240. In the dedicated memory pool scheme shown in FIG. 7A, local memory block 141 includes a pool of memory for each shader type rather than for each enabled execution pipeline 240, e.g., local vertex pools 710, local geometry pools 720, and local pixel pools 730. The memory pools may be sized differently for each shader type, therefore a different base address is used for each memory pool e.g., local vertex pools base 701, local geometry pools base 702, and local pixel pools base 703. The shader type may be used to locate the pool of memory within local memory block 141 allocated for that particular shader type. Each shader type memory pool is divided into equal portions that are each allocated to an enabled execution pipeline 240. Memory pools are not allocated to disabled execution pipelines 240 in order to better utilize local memory block 141 and stack memory block 142.

The unique identifier for a particular execution pipeline 240 may be used to locate the pool of memory for a shader type within local memory block 141 allocated for that particular execution pipeline 240. For example, a first portion of local pixel pools 730, local pixel pool 731 is allocated to a first execution pipeline 240 and another portion of local pixel pools 730, local pixel pool 739 is allocated to a last execution pipeline 240. Similarly, a first portion of local geometry pools 730, local geometry pool 721 is allocated to the first execution pipeline 240 and another portion of local geometry pools 720, local geometry pool 729 is allocated to the last execution pipeline 240. Finally, a first portion of local vertex pools 710, local vertex pool 711 is allocated to the first execution pipeline 240 and another portion of local vertex pools 710, local vertex pool 719 is allocated to the last execution pipeline 240.

Each dedicated shader type memory pool has a corresponding base address, e.g., local vertex pools base 701, local geometry pools base 702, and local pixel pools base 703. A particular local pixel pool allocated to an execution pipeline 240 may be addressed by combining local pixel pools base 703 with the unique identifier for the execution pipeline 240. Entries within the particular local pool allocated to a thread may be addressed using the memory offset corresponding to the thread (read from a thread table 330) and the load/store address specified by the program instruction.

FIG. 7B illustrates a conceptual diagram of local vertex pool 711 of FIG. 7A that is allocated to a single execution pipeline 240, in accordance with one or more aspects of the present invention. A vertex unit 750 is the amount of memory allocated to each thread and is sized for the largest amount of memory needed for any active vertex shader program. When vertex unit 750 is smaller than allocation unit 410, using per-shader type memory pools may enable more threads to run in parallel since local memory block 141 will be better utilized.

Figure 7C:
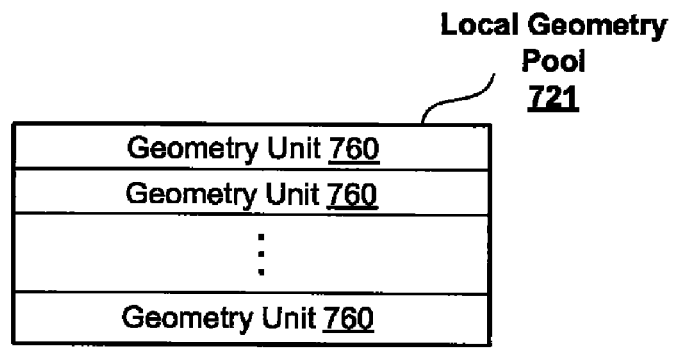
FIG. 7C illustrates a conceptual diagram of the local geometry pool of FIG. 7A in accordance with one or more aspects of the present invention.

FIG. 7C illustrates a conceptual diagram of local geometry pool 721 of FIG. 7A that is allocated to a single execution pipeline 240, in accordance with one or more aspects of the present invention. A geometry unit 760 is the amount of memory allocated to each thread and is sized for the largest amount of memory needed for any active geometry shader program. When geometry unit 760 is smaller than allocation unit 410, using per-shader type memory pools may enable more threads to run in parallel since local memory block 141 will be better utilized.

Figure 7D:
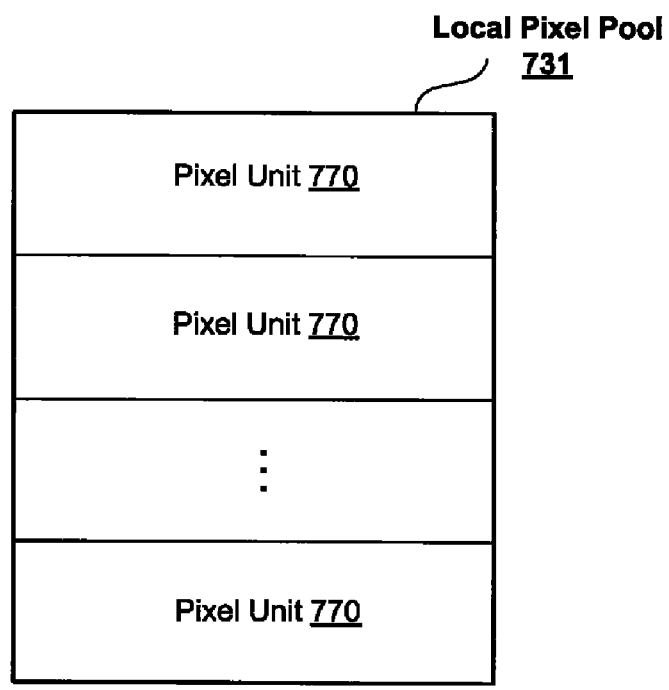
FIG. 7D illustrates a conceptual diagram of the local pixel pool of FIG. 7A in accordance with one or more aspects of the present invention.

FIG. 7D illustrates a conceptual diagram of local pixel pool 731 of FIG. 7A that is allocated to a single execution pipeline 240, in accordance with one or more aspects of the present invention. A pixel unit 770 is the amount of memory allocated to each thread and is sized for the largest amount of memory needed for any active pixel shader program. When pixel unit 770 is smaller than allocation unit 410, using per-shader type memory pools may enable more threads to run in parallel since local memory block 141 will be better utilized.

Using different size allocation units, e.g., vertex unit 750, geometry unit 760, and pixel unit 770, for each shader types is advantageous because memory within local memory block 141 and/or stack memory block 142 is not necessarily wasted for shader types that need less memory than the maximum amount of memory needed by any of the shader types. The methods of allocating and deallocating memory for threads "in order" or "out of order," described in conjunction with FIGS. 5B, 5C, 6B, and 6C may be used with memory pools dedicated for each shader type.

Figure 8A:
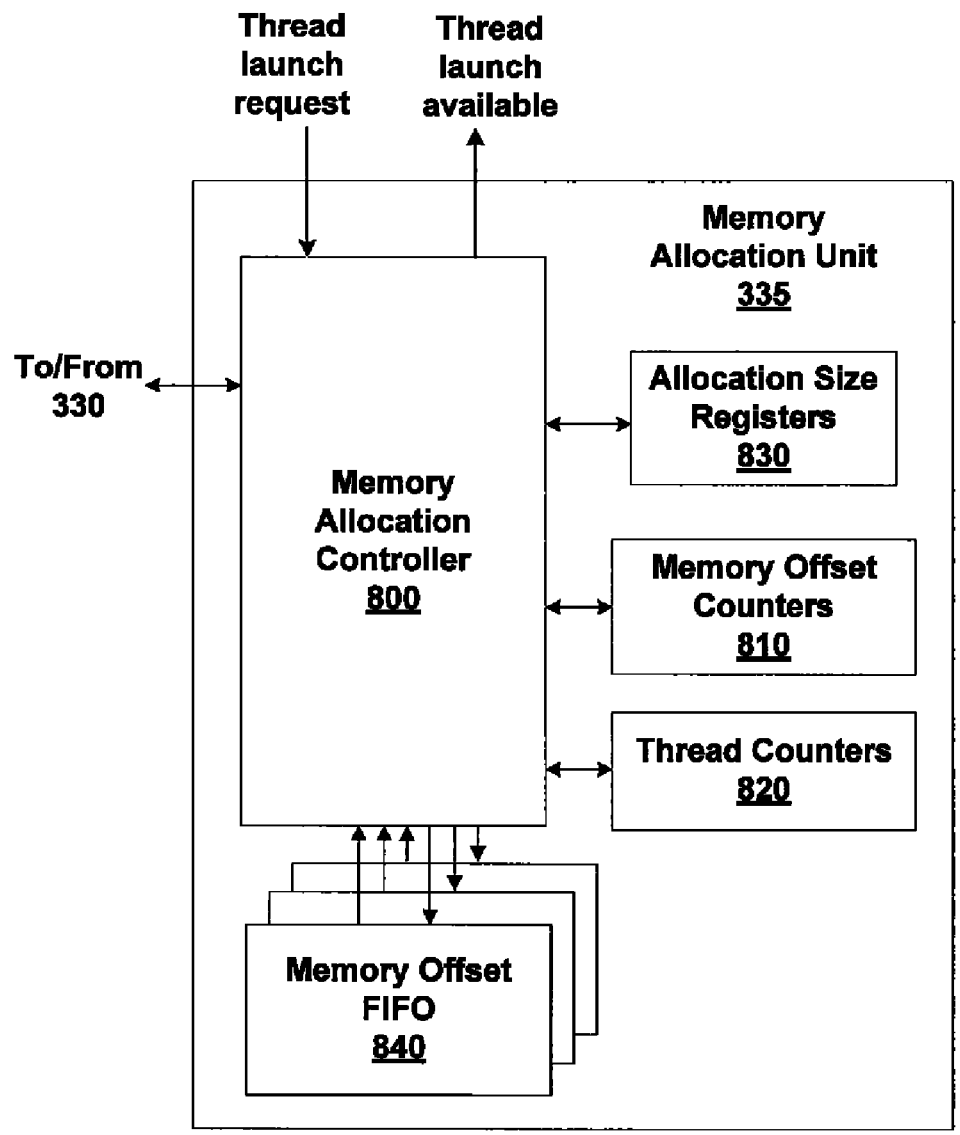
FIGS. 8A and 8B illustrate other block diagrams of the memory allocation unit of FIG. 3 in accordance with one or more aspects of the present invention.

FIG. 8A illustrates another block diagram of memory allocation unit 335 of FIG. 3 that is configured to support dedicated memory pools for each shader type using "out of order" allocation and deallocation, in accordance with one or more aspects of the present invention. A memory allocation controller 800 receives thread launch requests constructed by streaming multithreaded controller 320 based on samples received from pixel input buffer 214 and vertex input buffer 220 for processing by a shader program. Memory allocation controller 500 performs similar function to memory allocation controller 500 of FIG. 5A, accessing allocation size registers 830, memory offset counters 810, thread counters 820, and a memory offset FIFO memory 840 to read and write entries in thread tables 330.

Allocation size registers 830 is programmed by driver 113 and stores the sizes of each shader type allocation, e.g., vertex unit 750, geometry unit 760, and pixel unit 770. Before the size of an allocation unit may be changed, all allocation units for the shader type should be deallocated, i.e., all of the threads of the shader type should complete processing. Rather than having a single memory offset count, such as memory offset counter 510, this embodiment of memory allocation unit 335 includes a memory offset counter for each shader type in memory offset counters 810. Memory offset counters 810 are initialized to zero and the counter for a particular shader type is incremented by the corresponding value stored in allocation size registers 830 whenever an allocation unit is allocated to a thread for the particular shader type. Memory offset counters 810 wrap through zero when they overflow rather than saturating.

Rather than having a single thread counter, such as thead counter 520, this embodiment of memory allocation unit 335 includes a thead counter for each shader type in thread counters 820. Each counter may represent the maximum number of allocation units in the local pool corresponding to one shader type. For example, a vertex thread counter has a maximum value equal to the number of vertex units 750 within the local vertex pools allocated to execution pipelines 240 that are supported by memory allocation unit 335. Each thread counter within thread counters 820 is initialized to zero and increments whenever an allocation unit for a shader type is allocated to a thread to process the shader type. A memory offset counter in memory offset counters 810 and a thread counter in thread counters 820 are both reset to zero when the size of the allocation unit corresponding to the shader type is changed, i.e., when a register in allocation size registers 830 is written.

Memory offset FIFOs 840 each store memory offsets for allocation units that have been deallocated for one shader type and are available for allocation to launch another thread for the shader type. The number of entries in a memory offset FIFO 840 is equal to the maximum number of allocation units in the local pool corresponding to one shader type. The width of each offset FIFO 540 matches the width of memory offset counters 810. A memory offset FIFO 840 for a particular shader type is reset to empty when the size of the allocation unit for that shader type is changed.

Figure 8B:
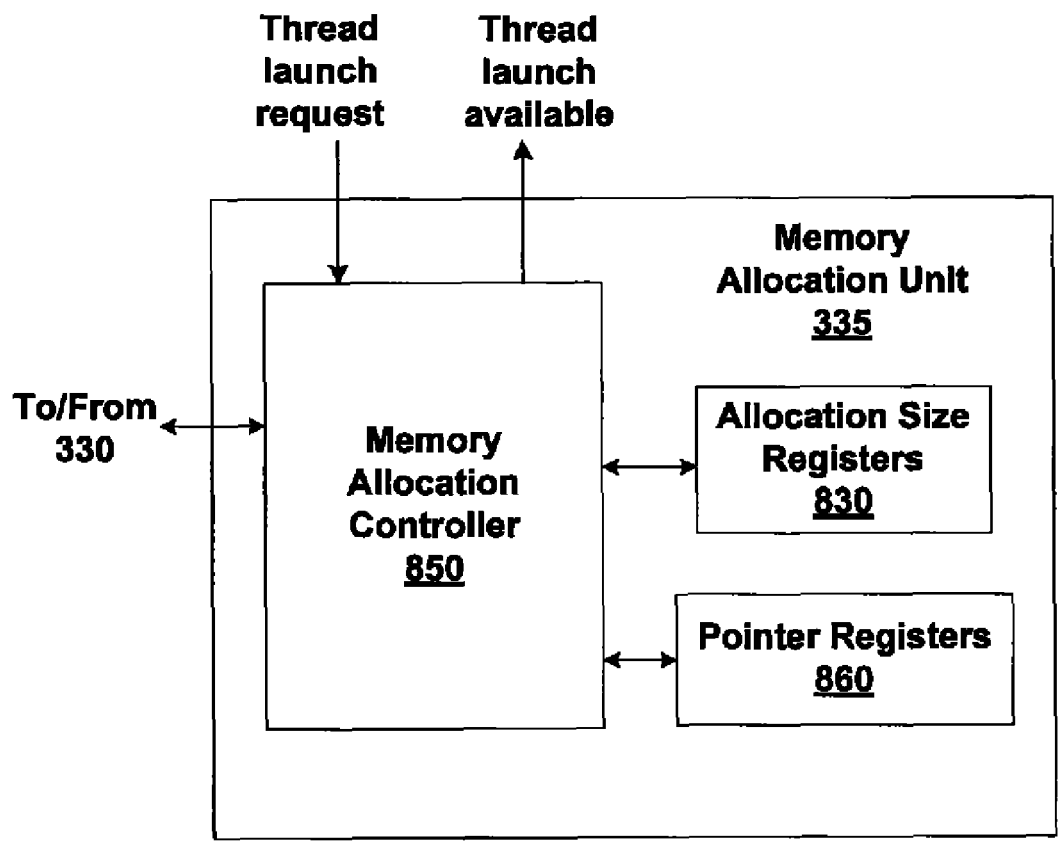

FIG. 8B illustrates another block diagram of memory allocation unit 335 of FIG. 3 that is configured to support dedicated memory pools for each shader type using "in order" allocation and deallocation, in accordance with one or more aspects of the present invention. In this embodiment of the present invention, memory allocation unit 335 includes a memory allocation controller 850 that accesses allocation size registers 830 and pointer registers 860 to read and write entries in thread tables 330.

Like pointer registers 610 of FIG. 6A, pointer registers 860 store a head pointer and a tail pointer that are used to configure a local memory pool as a ring buffer. However, pointer registers 860 store a head pointer and a tail pointer for each shader type memory pool to configure each shader type memory pool as a ring buffer. Unlike the embodiment of memory allocation unit 335 described in conjunction with FIGS. 5A, 5B, 5C, and 8A, the "out of order" memory allocation units 335, shader type allocation units may not be allocated and deallocated out of order. However, the die area needed to implement this embodiment is less than the "out of order" memory allocation unit 335 shown in FIGS. 5A and 8A. The head pointers and tail pointers are reset to zero when memory allocation unit 335 is reset. The head pointer and tail pointer for a shader type are both reset to zero when the size of the shader type allocation unit is changed, i.e., when the corresponding register in allocation size registers 830 is written. Memory allocation unit controller 850 also indicates that the ring buffer for a shader type is empty, i.e., not full, to distinguish for the case when the head and tail pointers are equal and the ring buffer for the shader type is full.

Persons skilled in the art will appreciate that any system configured to perform the method steps of FIG. 5B, 5C, 6B, or 6C, or their equivalents, is within the scope of the present invention. Systems and methods for dynamically allocating memory for thread processing may reduce memory requirements while maintaining thread processing parallelism. A memory pool is allocated to store data for processing multiple threads that does not need to be large enough to dedicate a fixed size portion of the memory pool to each thread that may be processed in parallel. Fixed size portions of the memory pool are dynamically allocated and deallocated to each processing thread. Different fixed size portions may be used for different types of threads to allow greater thread parallelism compared with a system that requires allocating a single fixed portion of the memory pool to each thread. The memory pool may be shared between all of the thread types or divided to provide separate memory pools dedicated to each particular thread type.

While the foregoing is directed to embodiments of the present invention, other and further embodiments of the invention may be devised without departing from the basic scope thereof, and the scope thereof is determined by the claims that follow. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

The invention claimed is:

1. A method of allocating memory for processing threads in a multithreaded processor to execute a shader program, comprising:
   receiving a thread launch request for a first thread;
   determining that the first thread requires a memory allocation to execute the shader program in the multithreaded processor;
   obtaining an available memory offset specifying an allocation unit within a memory pool allocated for processing the threads, wherein a size of the allocation unit is based on a largest amount of memory needed by any thread to execute the shader program in the multithreaded processor; and
   writing the available memory offset in an entry of a thread table to allocate the allocation unit within the memory pool to the first thread.

2. The method of claim 1, wherein the memory pool is dedicated to processing a first type of shader program and the size of the allocation unit is based on the largest amount of memory needed by any thread to execute the first type of shader program.

3. The method of claim 2, wherein a second memory pool is dedicated to processing a second type of shader program and the second memory pool includes a second allocation unit corresponding to the second type of shader program that is sized based on the largest amount of memory needed by any thread to execute the second type of shader program.

4. The method of claim 1, wherein the shader program is one type of shader program including a pixel shader program type, a vertex shader program type, and a geometry shader program type.

5. The method of claim 1, further comprising waiting for an allocation unit to be deallocated when a thread counter equals a maximum number of threads sharing the memory pool.

6. The method of claim 1, further comprising determining that a deallocated allocation unit is not available for allocation to the first thread.

7. The method of claim 1, further comprising:
   determining that a deallocated allocation unit is available for allocation to the first thread; and
   reading a memory offset of the deallocated allocation unit from a deallocation buffer to use as the available memory offset.

8. The method of claim 1, further comprising:
   processing the first thread to execute the shader program;
   obtaining the memory offset for the first thread; and
   storing the memory offset for the first thread in a deallocation buffer for allocation to another thread.

9. The method of claim 1, wherein the size of the allocation unit is based on the largest amount of memory needed by the shader program for storing stack data.

10. The method of claim 1, further comprising disabling a number of the processing threads by specifying a maximum number of the processing threads that can be execute in parallel to reduce an amount of memory needed for the memory pool.

11. A system for allocating memory for multiple execution threads, comprising:
- a thread table configured to store a memory offset for each one of the multiple execution threads;
- a multithreaded processing unit configured to process the multiple execution threads using the memory allocated to the multiple execution threads; and
- a memory allocation unit configured to allocate allocation units from a memory pool to the multiple execution threads and deallocate the allocation units as each one of the multiple execution threads completes execution of a shader program, wherein the memory allocation unit is further configured to deallocate allocation units in either the same or a different order than the allocation units are allocated.

12. The system of claim 11, wherein the memory allocation unit includes a thread counter configured to update a count of the multiple execution units that have been allocated memory by incrementing a current thread count by the one to produce a new thread count when one of the allocation units is allocated to one of the multiple execution threads.

13. The system of claim 12, wherein the memory allocation unit is further configured to wait for an allocation unit to be deallocated when the thread counter equals a maximum number of threads that share the memory pool.

14. The system of claim 11, wherein the memory allocation unit includes a memory offset counter configured to produce a memory offset for each one of the allocation units in the memory pool by increasing a current memory offset by a size of the allocation units to produce a new memory offset when one of the allocation units is allocated to one of the multiple execution threads.

15. The system of claim 11, further comprising an additional thread table and an additional multithreaded processing unit, wherein the memory allocation unit is configured to allocate a portion of the allocation units from the memory pool for processing a portion of the multiple execution threads by the additional multithreaded processing unit and store memory offsets for the portion of the allocation units.

16. The system of claim 15, wherein a number of the allocation units equals a number of entries in the thread table combined with a number of entries in the additional thread table.

17. The system of claim 11, wherein the memory allocation unit includes a memory offset first in first out (FIFO) memory configured to store memory offsets that have been deallocated and are available for allocation to one of the multiple execution threads.

18. The system of claim 11, wherein the memory pool is shared between the multiple execution threads for execution of a variety of shader program types including a pixel shader program type, a geometry shader program type, and a vertex shader program type.

19. The system of claim 11, wherein a size of the allocation unit within the memory pool is based on a largest amount of memory needed by any of the multiple execution threads to execute one type of shader including a pixel shader program type, a geometry shader program type, and a vertex shader program type.

20. The system of claim 11, wherein a portion of the multiple execution threads are disabled by specifying a maximum number of the multiple execution threads that can be processed in parallel to reduce an amount of memory needed for the memory pool.

* * * * *